(12) United States Patent
Graham

(10) Patent No.: US 12,674,514 B2
(45) Date of Patent: *Jul. 7, 2026

(54) VALVE STRUCTURE FOR PROPANE TANK AND METHOD THEREOF

(71) Applicant: North Atlantic Imports, LLC, Logan, UT (US)

(72) Inventor: Gary E. Graham, Hyde Park, UT (US)

(73) Assignee: North Atlantic Imports, LLC, Providence, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/828,563

(22) Filed: Sep. 9, 2024

(65) Prior Publication Data

US 2025/0067346 A1     Feb. 27, 2025

Related U.S. Application Data

(63) Continuation of application No. 17/502,348, filed on Oct. 15, 2021, now Pat. No. 12,085,175.

(60) Provisional application No. 63/092,380, filed on Oct. 15, 2020.

(51) Int. Cl.
F16K 1/30          (2006.01)

(52) U.S. Cl.
CPC .................................. F16K 1/305 (2013.01)

(58) Field of Classification Search
CPC ..... F16K 1/02; F16K 1/04; F16K 1/08; F16K 1/30; F16K 1/301; F16K 1/302; F16K 1/304; F16K 1/305; F16K 1/36; F16K 1/38; F16K 1/42; F16K 1/443; F16K 1/54; F16K 3/246
See application file for complete search history.

(56) References Cited

U.S. PATENT DOCUMENTS

| | | | |
|---|---|---|---|
| 2,692,750 A | 10/1954 | Davis, Jr. et al. | |
| 3,361,160 A | 1/1968 | Alper | |
| 3,433,250 A | 3/1969 | Hagihara | |
| (Continued) | | | |

FOREIGN PATENT DOCUMENTS

| | | |
|---|---|---|
| DE | 10318569 | 5/2004 |
| EP | 0581034 | 2/1994 |
| (Continued) | | |

OTHER PUBLICATIONS

Machine English translation of JP-2020159406-A (Year: 2025).*

*Primary Examiner* — Hailey K. Do

(74) *Attorney, Agent, or Firm* — David L. Stott

(57)          ABSTRACT

Embodiments of a propane tank valve are provided. In one embodiment, the propane tank valve includes a plug with a tapered portion, the plug moveable between closed and open positions relative to a valve passageway. Upon the plug being in the closed position, the tapered portion of the plug is positioned within the valve passageway. Upon the plug being initially moved from the closed position to the open position, the tapered portion of the plug is sized and configured to initially minimize the gas flow from the valve passageway and through a flow limiting device configured to be coupled to the propane tank valve such that movement of the tapered portion from the closed plug position initially forms a gap between a tapered surface of the tapered portion and an internal surface of the valve passageway.

21 Claims, 6 Drawing Sheets

(56)                    References Cited

U.S. PATENT DOCUMENTS

| | | | |
|---|---|---|---|
| 3,620,251 A * | 11/1971 | Bowen | F16K 1/42 |
| | | | 251/333 |
| 4,047,695 A | 9/1977 | Cleveland et al. | |
| 4,809,740 A | 3/1989 | Nevlud | |
| 4,951,722 A | 8/1990 | Nitzberg et al. | |
| 5,370,357 A | 12/1994 | Jones | |
| 5,462,081 A | 10/1995 | Perusek et al. | |
| 5,560,343 A | 10/1996 | Werkmann et al. | |
| 5,613,518 A | 3/1997 | Rakieski | |
| 6,182,692 B1 | 2/2001 | Fischer et al. | |
| 6,209,562 B1 | 4/2001 | Shaw | |
| 6,367,775 B1 | 4/2002 | Nimberger | |
| 6,408,869 B1 | 6/2002 | Bartos et al. | |
| 6,513,545 B2 | 2/2003 | Rhone et al. | |
| 6,530,396 B1 | 3/2003 | Frey | |
| 6,595,486 B2 | 7/2003 | Chen | |
| 6,895,952 B1 | 5/2005 | Bachelder | |
| 6,910,499 B2 | 6/2005 | Chan | |
| 7,677,530 B2 | 3/2010 | Hasunuma | |
| 7,708,028 B2 | 5/2010 | Brown et al. | |
| 9,689,499 B2 | 6/2017 | Eckholz | |
| 10,344,872 B2 | 7/2019 | Yazawa et al. | |
| 10,738,894 B2 | 8/2020 | Oike | |
| 2004/0221893 A1 | 11/2004 | Johnson | |
| 2011/0232779 A1 | 9/2011 | Oh | |

FOREIGN PATENT DOCUMENTS

| | | | | |
|---|---|---|---|---|
| EP | 2487396 A1 * | 8/2012 | ............. | F16K 27/02 |
| JP | 2020159406 A * | 10/2020 | ....... | H01L 21/67017 |
| WO | WO-2019187866 | 10/2019 | | |

* cited by examiner

VALVE STRUCTURE FOR PROPANE TANK AND METHOD THEREOF

CROSS-REFERENCE TO RELATED APPLICATIONS

This application is a continuation of U.S. patent application Ser. No. 17/502,348, filed Oct. 15, 2021, which claims the benefit of U.S. Provisional Application No. 63/092,380, filed Oct. 15, 2020, the disclosures of which are hereby incorporated by reference herein in their entirety.

TECHNICAL FIELD

The present invention relates generally to propane gas valves and, more specifically, the present invention relates to propane gas valves for controlling gas flow therefrom.

BACKGROUND

Barbequing has become a popular and pervasive tradition in much of the world. A barbeque grill is a device for cooking food by applying heat to a cooking surface, such as a grill or a griddle type of outdoor cooking station. Often the heating of outdoor cooking stations is employed with propane gas supplied from a propane gas tank. For safety reasons, it is required to include a flow limiting device in-line between the propane gas tank and its associated cooking station. Flow limiting devices are employed so that if the gas flow progresses above a certain limit or level, the gas flow will be limited to about a tenth of the maximum flow. Flow limiters are commonly used on pressurized containers as a safety device to minimize the flow if, for example, the delivery line should rupture. Further, flow limiters are often used as safety equipment on pressurized tanks containing propane or other explosive gasses. Once the flow limiting devices are triggered to minimize the gas flow, it can be difficult and time consuming to reset the cooking station to establish or re-establish appropriate gas flow to the cooking station. Additionally, it has been found that flow limiting devices often are unnecessarily triggered when initially opening the valve of the propane tank.

BRIEF SUMMARY OF THE INVENTION

The present invention is directed to various embodiments of a propane tank configured to control gas flow therefrom. In one embodiment, the propane tank is configured to control gas flow through a passageway defined in a flow limiting device. The propane tank includes a tank and a valve assembly, the tank sized and configured to hold the propane gas therein, and the valve assembly coupled to the tank and configured to be coupled to the flow limiting device. The valve assembly includes a valve body, a plug, and a handle. The valve body is coupled to the tank, the valve body includes a valve passageway with a valve seat at one end of the valve passageway. The plug includes one end portion positionable against the valve seat, the one end portion of the plug extending with a tapered portion such that the tapered portion is extendable into the valve passageway adjacent the valve seat. The handle is operatively coupled to the plug such that the handle is moveable to move the plug between a closed plug position and an open plug position. Upon the plug being in the closed plug position, the plug is engaged with the valve seat with the tapered portion of the plug extending into the valve passageway. Further, upon the plug being initially moved from the closed position to the open position, the tapered portion of the plug is sized and configured to initially minimize the gas flow from the valve passageway and through the flow limiting device such that movement of the tapered portion from the closed plug position initially forms a gap between a tapered surface of the tapered portion and an internal surface of the valve passageway.

In another embodiment, the handle includes a handle stem with external threads thereon. In a further embodiment, the handle stem engages internal threads of an insert, the insert at least partially positioned within the valve body. In still another embodiment, the valve passageway extends longitudinally to define a valve passageway axis, the valve passageway axis extending through the plug and the handle. In another embodiment, the handle is configured to rotate to linearly move the plug, the handle rotating about a handle axis. In yet another embodiment, the valve passageway extends longitudinally to define a valve passageway axis, the valve passageway axis extending through the plug and the handle, the valve passageway axis extending coaxial with the handle axis.

In another embodiment, the tapered portion extends with a conical configuration. In another embodiment, the tapered portion extends with a truncated conical configuration. In still another embodiment, the tapered portion of the plug extends with a first surface and a second surface with a tapered surface extending between the first and second surfaces. In another embodiment, upon the plug being in the closed plug position, the first surface directly engages an end surface of the valve seat. In another embodiment, upon the plug being in the closed plug position, a surface of the tapered portion engages an internal surface defining the valve passageway. In still another embodiment, the tapered portion of the plug is sized and configured to maintain the gas flow below a predetermined flow rate upon the plug initially being moved to the opened plug position. In another embodiment, the tapered portion extends to define a curved surface.

In accordance with another embodiment of the present invention, a propane tank valve configured to couple to a tank and control gas through a passageway defined in a flow limiting device. The propane tank valve includes a valve assembly coupled to the tank and configured to be coupled to the flow limiting device, the valve assembly including a valve body, a plug, and a handle. The valve body is coupled to the tank, the valve body including a valve passageway with a valve seat at one end of the valve passageway. The plug includes one end portion positionable against the valve seat, the one end portion of the plug extending with a tapered portion, the tapered portion extendable into the valve passageway adjacent the valve seat. The handle is operatively coupled to the plug such that the handle is moveable to move the plug between a closed plug position and an open plug position. With this arrangement, upon the plug being in the closed plug position, the plug is engaged with the valve seat with the tapered portion of the plug extending into the valve passageway. Further, upon the plug being initially moved from the closed position to the open position, the tapered portion of the plug is sized and configured to initially minimize the gas flow from the valve passageway and through the flow limiting device such that movement of the tapered portion from the valve passageway forms a gap between a tapered surface of the tapered portion and an internal surface of the valve passageway.

In another embodiment, the tapered portion extends with a conical configuration. In another embodiment, the tapered portion of the plug extends with a first surface and a second surface with the tapered surface extending between the first and second surfaces. In still another embodiment, upon the plug being in the closed plug position, the first surface directly engages an end surface of the valve seat. In yet another embodiment of the present invention, upon the plug being in the closed plug position, the tapered surface of the tapered portion engages an internal surface defining the valve passageway. In another embodiment, the tapered portion of the plug is sized and configured to maintain the gas flow below a predetermined flow rate upon the plug initially being moved to the opened plug position. In another embodiment, the tapered portion extends to define a curved surface.

In accordance with another embodiment of the present invention, a method for controlling gas flow through a flow limiting device is provided. The method includes the steps of: maintaining propane gas within a propane tank with a plug positioned in a closed plug position so as to block a valve passageway defined in a valve body coupled to the propane tank, the plug, in the closed plug position, includes a tapered portion extending into the valve passageway; and turning a handle of the propane tank such that rotation of the handle linearly moves the plug from the closed plug position to an open plug position such that the tapered portion initially moves in the valve passageway to provide a gap between a tapered surface of the tapered portion and an internal surface of the valve passageway to facilitate gas flow through the gap and through the flow limiting device such that the tapered portion initially minimizes gas flow through the flow limiting device to initially prevent tripping a blocking component of the flow limiting device.

In another embodiment, the turning the handle step includes gradually increasing the gas flow through the gap due to the gap becoming larger with movement of the tapered surface relative to the inner surface of the valve passageway. In another embodiment, the turning the handle step includes moving the tapered portion completely from the valve passageway. In still another embodiment, the turning the handle step includes moving the tapered portion from the valve passageway such that the tapered portion extends at least partially with a conical configuration.

In accordance with another embodiment of the present invention, a propane tank for controlling delivery of propane gas therefrom is provided. The propane tank includes a tank, a valve body, a plug, a handle, and a flow limiting device. The tank is sized and configured to hold the propane gas therein. The valve body is coupled to the tank, the valve body including a valve passageway with a valve seat at one end of the valve passageway. The plug includes one end portion positionable against the valve seat, the one end portion of the plug extending with a tapered surface extendable into the valve passageway adjacent the one end thereof. The handle is operatively coupled to the plug such that the handle is moveable to move the plug between a closed plug position and an open plug position. The flow limiting device is coupled to the valve body, the flow limiting device including a flow limiting device passageway defined therein. The flow limiting device passageway configured to communicate with the valve passageway upon the plug being in the plug open position, the flow limiting device sized and configured to control gas flow from the tank with a blocking component that is moveable to a blocking position upon the gas flow moving through the flow limiting device passageway being above a predetermined flow rate. With this arrangement, upon the plug being in the closed plug position, the tapered surface of the plug is sized and configured to extend into the valve passageway adjacent the one end of the valve passageway. Further, upon the plug being initially moved from the closed position to the open position, the tapered surface of the plug is sized and configured to initially maintain the gas flow below the predetermined flow rate so as to substantially prevent the blocking component from being moved to the blocking position.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
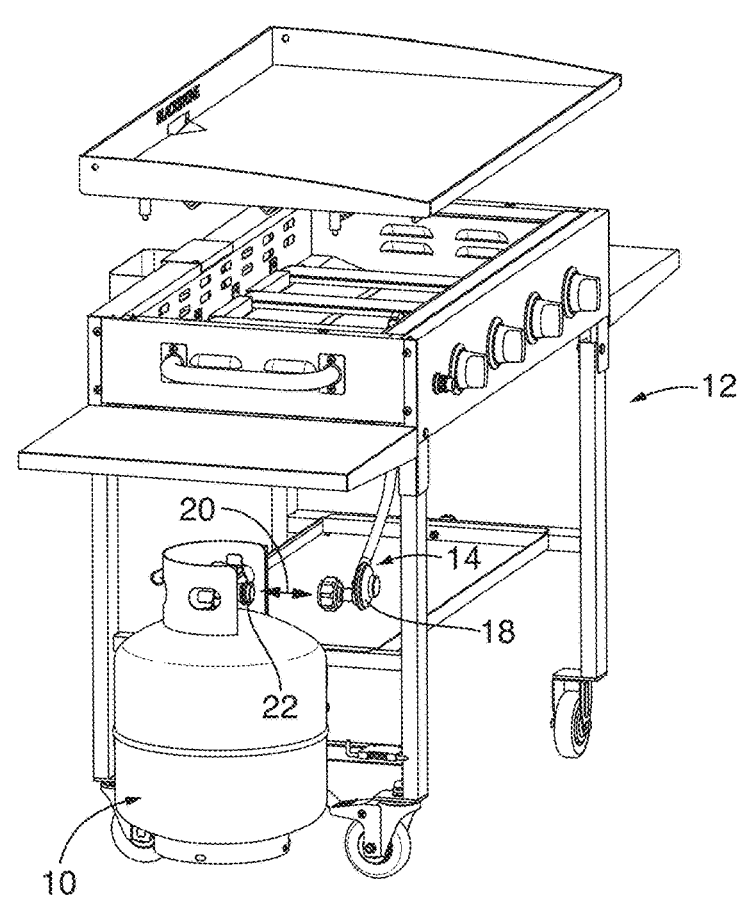
FIG. 1 is a perspective side view of a propane tank disconnected from a flow limiting device, depicting the flow limiting device connected to a cooking station, according to an embodiment of the present invention.
Figure 2:
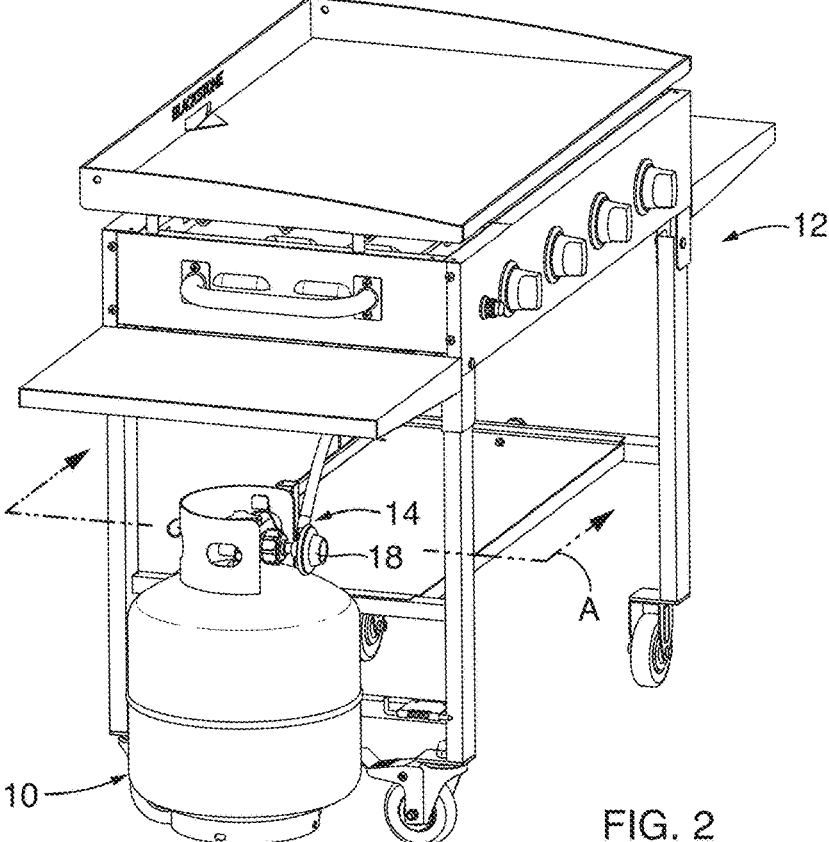
FIG. 2 is a perspective side view of the propane tank connected to the flow limiting device and the cooking station, according to another embodiment of the present invention.
Figures 3, 3A:
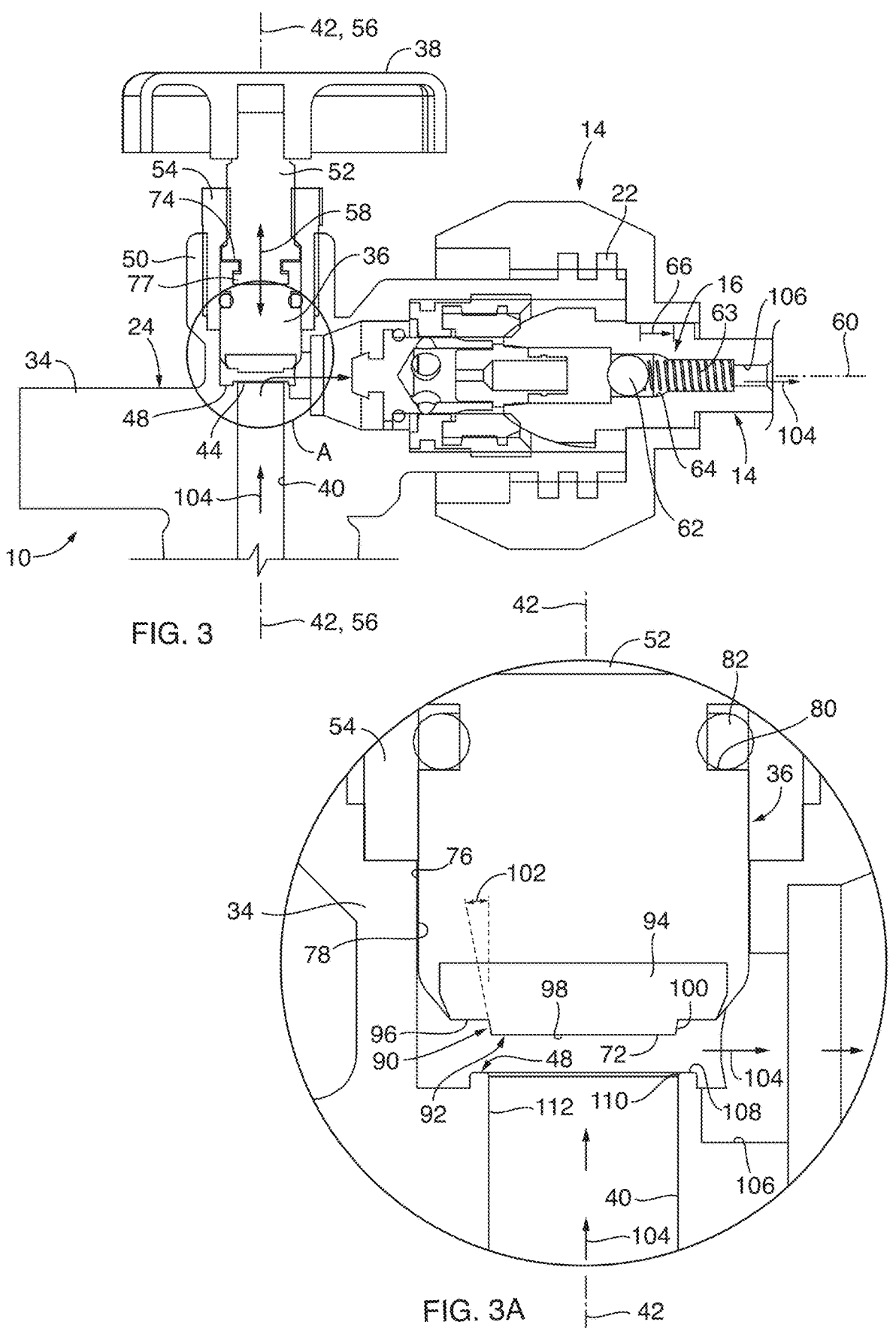
FIG. 3 is an enlarged cross-sectional view of a portion of the propane tank and the flow limiting device of FIG. 2A, depicting a plug of the propane tank in an open position, according to another embodiment of the present invention.
FIG. 3A is an enlarged cross-sectional view of the plug in the open position taken from region A of FIG. 3, depicting the plug spaced from a valve seat, according to another embodiment of the present invention.

Referring to FIGS. 1, 2 and 3, a propane tank 10 sized and configured to hold propane gas is provided. The propane tank 10 may be employed with a cooking station 12, such as a grill or griddle type cooking station, or other devices that may utilize propane gas as a fuel. The propane tank 10 may be coupled to the cooking station 12 with a flow limiting device 14 therebetween, for safety reasons. For example, the flow limiting device 14 may include a tripping component 16 that closes-off or blocks the flow of propane gas through the flow limiting device 14 upon there being a sudden change in the flow rate passing through the flow limiting device 14. Further, the flow limiting device 14 includes a pressure regulator 18 associated therewith that limits the fuel pressure moving through the flow limiting device 14 to a predetermined pressure level. As shown by bidirectional arrow 20, the propane tank 10 may include a coupling member 22 sized and configured to be coupled to, or decoupled from, the flow limiting device 14. The coupling member 22 may act as a gas inlet for filling the propane tank 10 or as a gas outlet for delivering propane gas from the propane tank 10, through the flow limiting device 14, and to the cooking station 12, for example. In regard to delivering propane gas, the propane tank 10 may include valve structure 24 that minimizes or controls gas flow, at least initially, that may be delivered from the propane tank 10 and through the flow limiting device 14 such that the tripping component 16 may not be triggered. In this manner, the valve structure 24 is sized and configured to substantially prevent the tripping component 16 from tripping or closing-off the flow limiting device 14 upon initially feeding fuel through the flow limiting device 14 so that gas flow progressing toward the cooking station may be maintained.

Figure 2A:
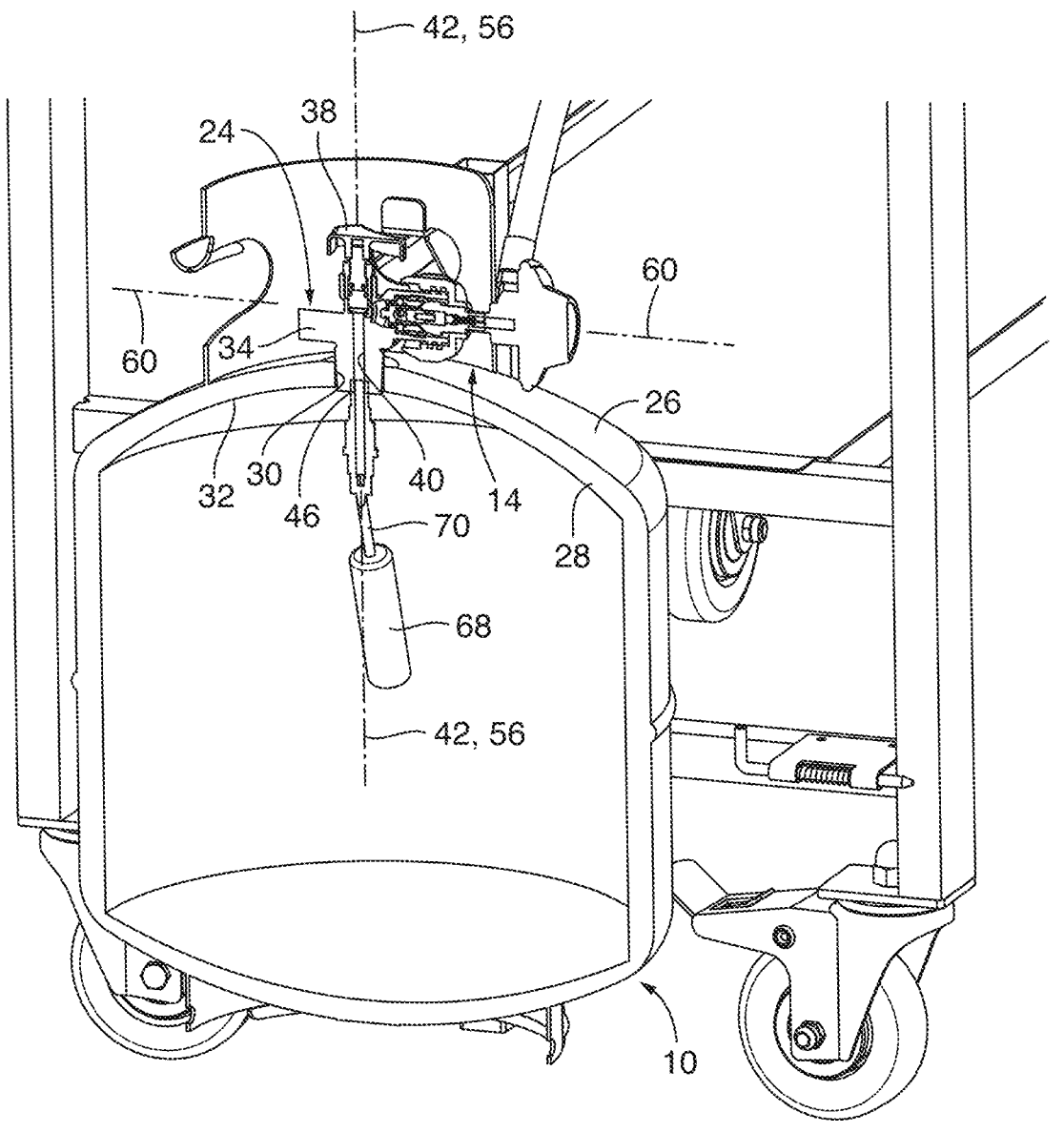
FIG. 2A is a cross-sectional view of the propane tank taken along section line A-A of FIG. 2, according to another embodiment of the present invention.

With reference to FIGS. 2A and 3, the propane tank 10 may include a tank 26 and the valve structure 24 or valve assembly. The tank 26 may be sized and configured to hold propane gas under pressure, similar to the typical 20 pound tanks, but may be any suitable tank or vessel designed to hold a fuel under pressure. The tank 26 may extend with a wall 28 such that the wall 28 defines an opening 30, such as along a top portion 32 of the tank 26. The opening 30 defined in the tank 26 may be sized and configured to hold a valve body 34. Such valve body 34 may be rotatably secured and sealed within the opening 30 of the tank 26 such that the valve body 34 is not intended to be removed from the tank 26 during operational use.

The valve structure 24 may include multiple components assembled to the valve body 34 and secured within the opening 30 of the tank 26, as set forth. For example, the valve structure 24 may include, among other components, the valve body 34, a plug 36 and a handle 38 each sized and configured to cooperate together so as to control propane gas to funnel through a valve passageway 40 defined in the valve body 34. The valve passageway 40 defined within the valve body 34 may extend longitudinally with a length so as to define a valve passageway axis 42 along the length. In one embodiment, the length of the valve passageway 40 may extend vertically within the valve body 34 between a first end 44 and a second end 46, the first end 44 of the valve passageway 40 including and extending to define a valve seat 48. The valve seat 48 may be sized and configured to engage one side of the plug 36, discussed further herein.

The valve body 34 may also include a handle body portion 50 extending away or upward from and adjacent to the first end 44 of the valve passageway 40. Such handle body portion 50 may be coupled to and may be sized and configured to hold the plug 36 and other components movable with the handle 38. For example, the handle 38 may be fixedly coupled to a handle stem 52, the handle stem coupled to the plug 36. The handle stem 52 may include external threads that may engage internal threads of a housing insert 54. The housing insert 54 may be fixedly positioned within the handle body portion 50. The handle 38 and handle stem 52 may rotate about a handle axis 56, the handle axis 56 extending longitudinally through the plug 36 and the valve passageway 40. Further, the handle axis 56 may be coaxial with and relative to the valve passageway axis 42. With this arrangement, upon rotating the handle 38, the plug 36 may linearly move, as shown by bi-directional arrow 58, within the valve body 34 between a closed position and an open position. For example, clockwise rotation of the handle 38 may move the plug 36 downward toward the closed position, and counter-clockwise rotation of the handle 38 may move the plug upward toward the open position. In one embodiment, the handle stem 52 may rotate with the handle 38 such that the handle stem 52 may be rotatably coupled to the plug 36 so that the plug 36 may not rotate, but be pushed or pulled linearly within the housing insert 54 and the handle body portion 50. In another embodiment, the plug 36 may be fixed to the handle stem 52 such that the plug 36 rotates with the handle 38 and handle stem 52.

As previously set forth, the valve body 34 may extend to define the coupling member 22, the coupling member sized and configured to interconnect with structure of the flow limiting device 14. In one embodiment, the coupling member 22 and the flow limiting device 14 may extend laterally relative to the valve passageway axis 42 and the handle axis 56. The coupling member 22 and the flow limiting device 14 may extend to define a secondary axis 60 along which the gas may flow, upon moving the plug 36 to the open position. The secondary axis 60 may extend laterally or perpendicular relative to the valve passageway axis 42 such that a lateral passageway 106 may extend generally along the secondary axis 60. As previously set forth, upon a sudden change in the flow rate of propane gas through the flow limiting device 14, the flow limiting device 14 may be sized and configured to be tripped with the tripping component 16 or blocking component so as to minimize or effectively shut-off the gas flow. Such tripping component 16 may be employed with a ball 62 and spring 63 arrangement being moveable to a blocking position against a blocking seat 64, as shown by arrow 66, as known to one of ordinary skill in the art. One example of a flow limiting device is disclosed in U.S. Pat. No. 4,809,740, the disclosure of which is incorporated herein in its entirety. Further, other components that may be necessary for the propane tank 10 to function appropriately and safely may be implemented with the propane tank disclosed herein, as known to one of ordinary skill in the art. For example, the propane tank may include a float 68, pivotably connected with an extension 70 to the valve passageway 40 of the valve body 34. The float 68 may be sized and configured to float within the tank 26 and, as the tank is optimally filled, the float can pivot and block-off further filling of the tank 26, as known to one of ordinary skill in the art.

Figures 6, 7:
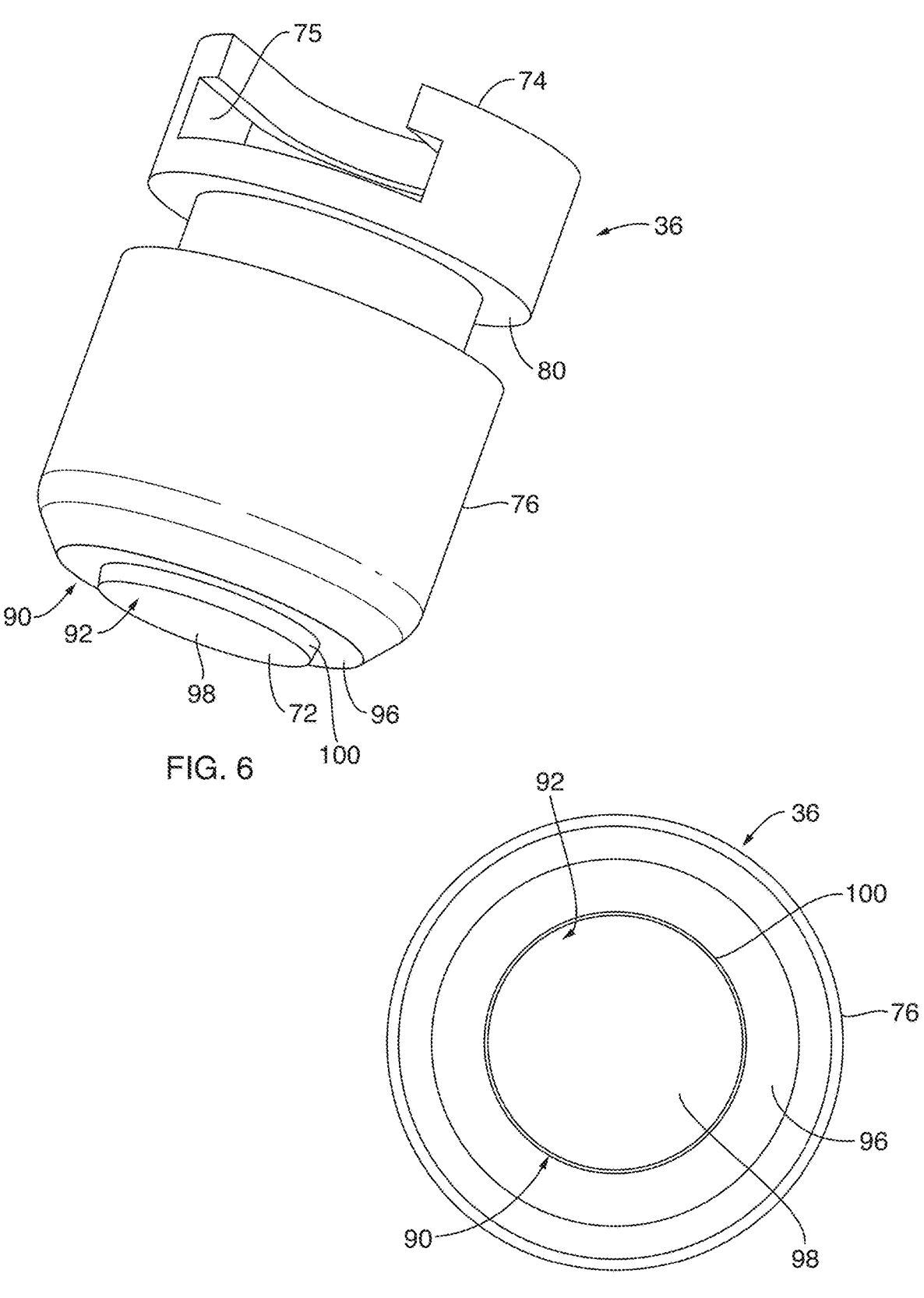
FIG. 6 is a perspective view of the plug, separate from other components of the propane tank, according to another embodiment of the present invention.
FIG. 7 is a bottom view of the plug, according to another embodiment of the present invention.

With reference to FIGS. 3, 3A, 6 and 7, as previously set forth, the plug 36 may extend between the handle stem 52 and the valve passageway 40. The plug 36 may be coupled to the handle stem 52 with a notch 75 defined in the plug 36 such that the handle stem 52 may extend with a flange structure 77 sized and configured to mate with the notch 75 defined in the plug 36. Further, the plug 36 may be elongated to extend longitudinally between a plug first end 72 and a plug second end 74 so as to extend longitudinally relative to and adjacent the valve passageway axis 42. Further, the plug 36 may extend longitudinally along the handle axis 56. The plug 36 may include a side surface 76 that may slidingly move along an inner surface 78 of the housing insert 54 and the valve body 34. The side surface 76 may extend radially to correspond with the inner surface 78 such that the side surface 76 may extend with a circular profile, as depicted in FIG. 7. Further, the side surface 76 may define a recess 80 sized and configured to hold an O-ring 82 so that the plug 36 may be sealingly engaged with the insert 54 and/or valve body 34. Further, the plug 36 may extend with a tapered portion 90 along a first end portion 92 of the plug 36, adjacent the first end 72 of the plug 36. The first end portion 92 and/or the tapered portion 90 may be sized and configured to nest with the valve seat 48 of the valve passageway 40. In one embodiment, the tapered portion 90 may be integrated with the plug 36 by securing a plug insert 94 in the plug 36, via adhesively or mechanically. In other words, the plug insert 94 may exhibit the tapered portion 90 of the plug 36. In another embodiment, the tapered portion 90 of the plug 36 may be integrally formed with the plug 36, such that the tapered portion 90 and plug 36 are a one-piece monolithic structure, and such that the plug 36 with the tapered portion 90 may be a molded or machined piece.

Further, the first end portion 92 may extend with a first surface 96 and a second surface 98 with a tapered surface 100 therebetween. The tapered portion 90 may include the tapered surface 100. The tapered surface 100 and tapered portion 90 may extend partially as a conical configuration or partially as a conical profile or truncated conical profile. As such, the tapered surface 100 and tapered portion 90 may extend radially in a circular configuration or circular profile, as depicted in FIGS. 6 and 7. Other configurations may also be implemented that may correspond and nest with the valve seat 48. The first and second surfaces 96, 98 may face in a common direction, such as downward toward the valve passageway 40. The first and second surfaces 96, 98 may be flat surfaces. The first and second surfaces 96, 98 may be flat surfaces extending to define first and second planes, respectively. In one embodiment, the first and second planes defined by the respective first and second surfaces 96, 98 may extend substantially parallel relative to each other.

In another embodiment, the first and second surfaces 96, 98 may extend laterally relative to the valve passageway axis 42 and/or the handle axis 56. In another embodiment, the first and second surfaces 96, 98 may extend generally perpendicular relative to the valve passageway axis 42 and/or the handle axis 56. In still another embodiment, the first and second surfaces 96, 98 may extend generally perpendicular relative to the side surface 76 of the plug 36. In another embodiment, the first surface 96 may extend generally perpendicular relative to the side surface 76 of the plug 36. In another embodiment, the tapered surface 100 may extend at an angle 102 relative to the first surface 96 that is less than 90 degrees. In still another embodiment, the tapered surface may extend at the angle relative to the valve passageway axis 42 that is less than 90 degrees. In still another embodiment, the tapered surface 100 may extend at the angle relative to the valve passageway axis 42 that is greater than about 60 degrees and less than 90 degrees. In still another embodiment, the tapered surface 100 may extend with a radial surface or radial component relative to the valve passageway axis 42, as depicted in FIGS. 6 and 7.

Figures 4, 4A:
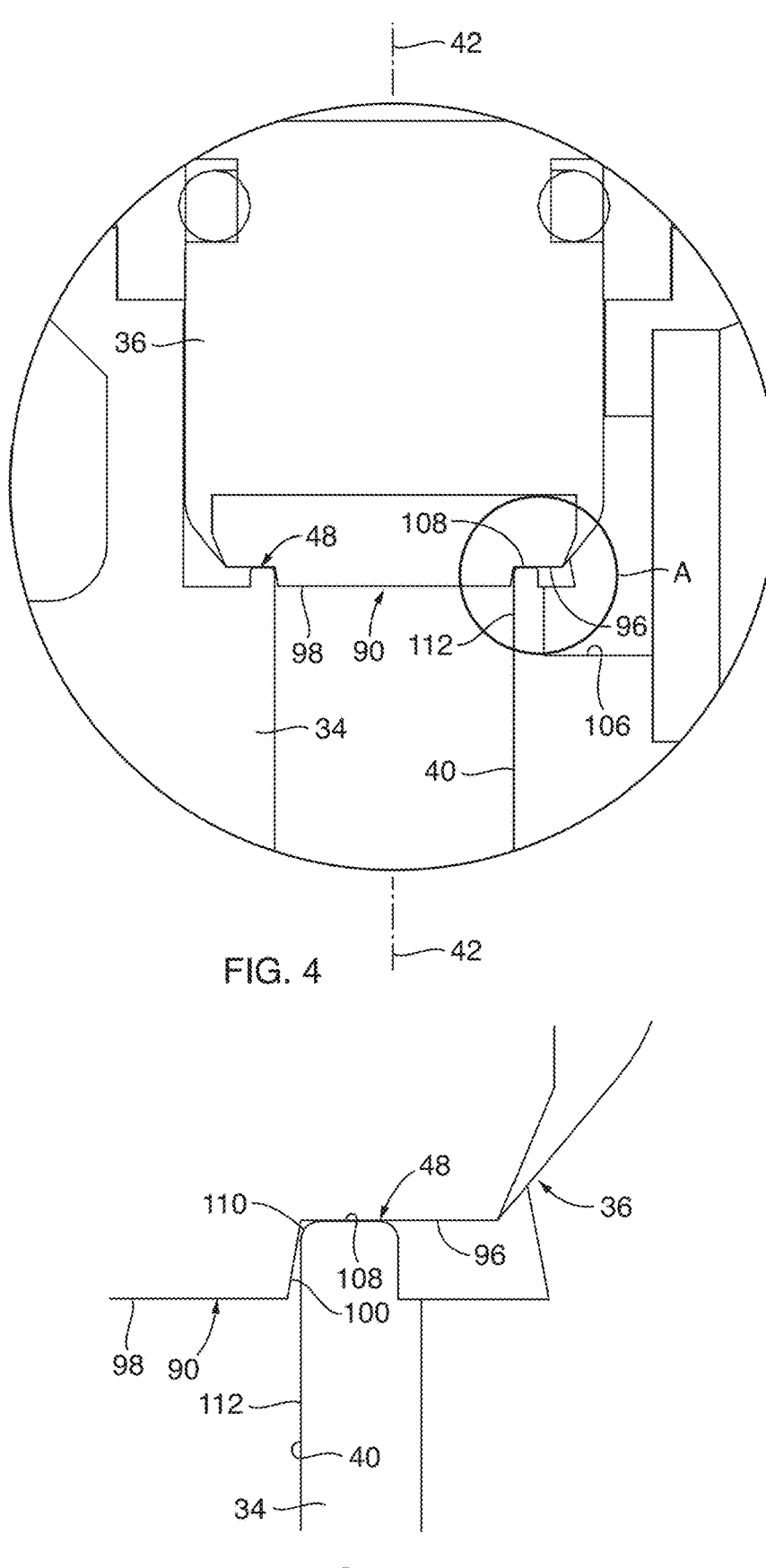
FIG. 4 is an enlarged cross-sectional view of the plug in a closed position, depicting the plug engaged with the valve seat, according to another embodiment of the present invention.
FIG. 4A is an enlarged cross-sectional view of the plug and valve seat taken from region A of FIG. 4, according to another embodiment of the present invention.
Figure 5:
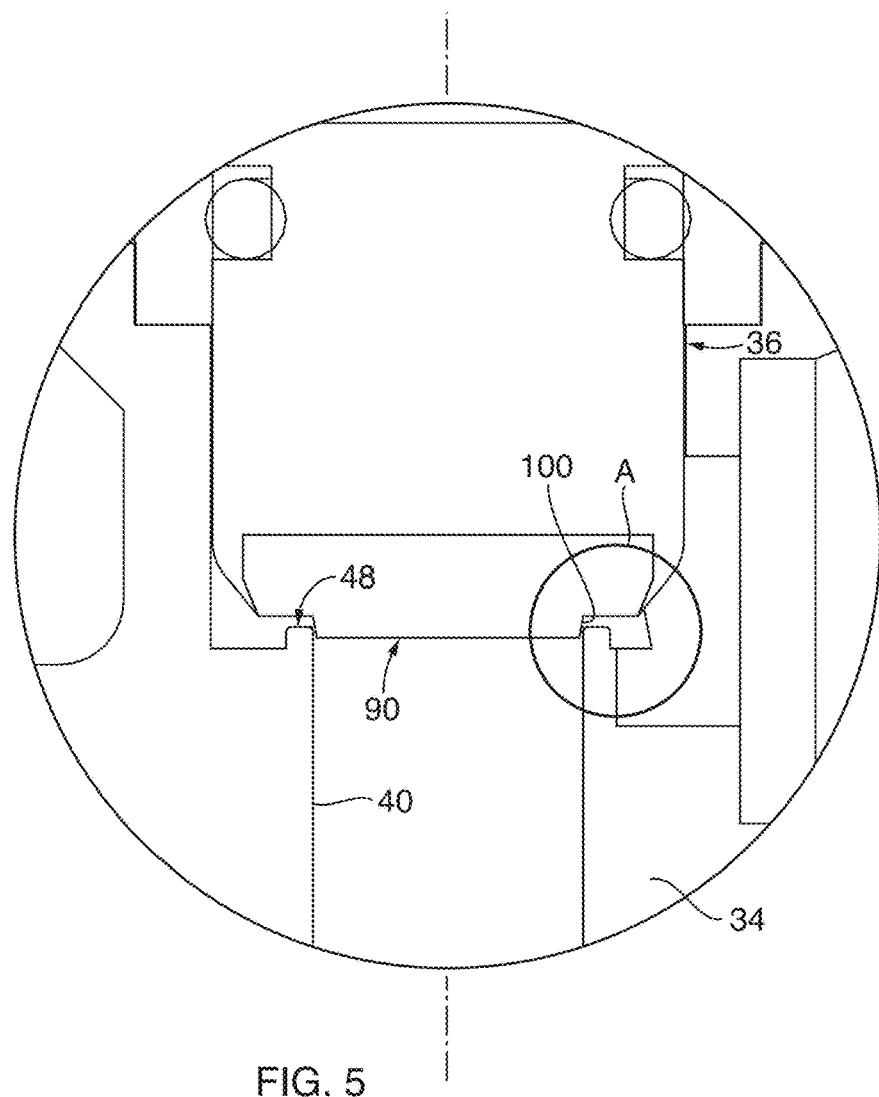
FIG. 5 is an enlarged cross-sectional view of the plug in a partially open position, according to another embodiment of the present invention.
Figure 5A:
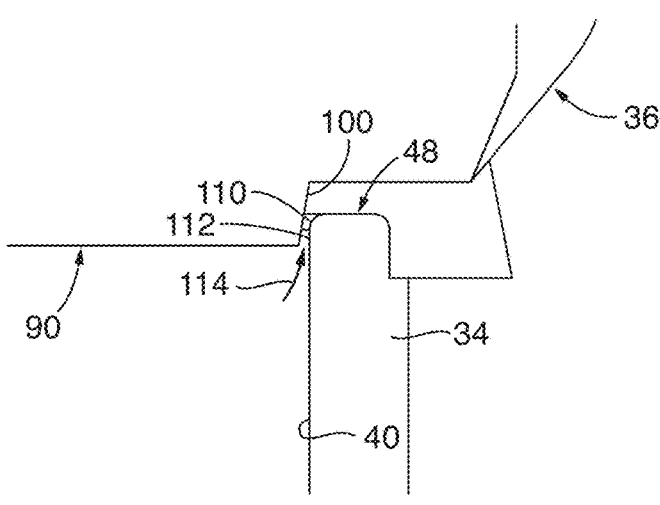
FIG. 5A is an enlarged cross-sectional view of the plug in the partially open position taken from region A of FIG. 5, depicting the plug moved away from the valve seat with a tapered portion of the plug within the passageway, according to another embodiment of the present invention.

Now with reference to FIGS. 3A, 4 and 4A, as previously set forth, the plug 36 is moveable linearly along the valve passageway axis 42 and the handle axis 56 between the open position (FIG. 3A) and the closed position (FIG. 4). Upon the plug 36 being in the open position, propane gas may flow, as shown by arrow 104, from the tank 26 (FIG. 2A), through the valve passageway 40, and through the lateral passageway 106 of the flow limiting device 14 (see also, FIG. 3). As previously indicated, moving the handle 38 counter-clockwise may move the plug 36 away from the valve seat 48 of the valve passageway 40. Further, moving the handle 38 clockwise may move the plug 36 toward the valve seat 48 of the valve passageway 40. Upon moving the plug 36 to a fully closed position, the first surface 96 of the plug 36 may abut directly against an end surface 108 of the valve seat 48. In addition, the tapered surface 100 of the plug 36 may directly contact an inner surface 110 of the valve seat 48. The inner surface 110 of the valve seat 48 may extend radially between the end surface 108 and an inner passage surface 112 of the valve passageway 40. In this manner, in the closed position of the plug 36, at least one of the first surface 96 and the tapered surface 100 may directly contact the valve seat 48 such that the plug 36 blocks the flow of gas downstream of the valve passageway 40. Further, in one embodiment, in the closed position of the plug 36, the second surface 98 and the tapered surface 100 of the tapered portion 90 may be positioned within the valve passageway 40 at least at an end portion of the valve passageway 40 adjacent the valve seat 48, the valve passageway 40 being defined by the valve body 34.

Now with reference to FIGS. 3, 4, 5 and 5A, upon initially moving or rotating the handle 38 from the closed position, a gap 114 defined between the tapered surface 100 of the plug 36 and the inner surface 110 and/or the inner passage surface 112 of the valve passageway 40 is formed. This gap 114 formed with the tapered surface 100 or tapered portion 90 being positioned within the valve passageway 40 may be sized and configured to minimize gas flow through the flow limiting device 14, at least at the initial stage of turning the handle 38 to the open position. By initially minimizing the flow through the flow limiting device 14, the potential of the tripping component 16 being tripped due to a sudden change in flow through the flow limiting device 14 is minimized. Due to the relationship of the surface of the plug 36 extending within the valve passageway 40, such as the tapered surface 100, the gap 114 gradually may become larger as the plug 36 moves away or upward from the valve seat 48 of the valve body 34 toward the open position depicted in FIG. 3A. In this manner, as the handle 38 is moved from the closed position toward a fully open position, the tapered portion 90 may initially minimize the gas flow through the flow limiting device 14 via the tapered surface 100 extending within the valve passageway. Such initial minimization of the gas flow may substantially prevent the blocking component 16 in the flow limiting device 14 from tripping unnecessarily so that the user may maintain gas flow through the flow limiting device 14 and toward the cooking station 12 (see FIG. 2).

The various structural components associated with the propane tank, as known to one of ordinary skill in the art, may be formed of various metallic materials, such as steel, stainless steel, copper, brass, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A propane tank configured to control gas flow through a passageway defined in a flow limiting device, the propane tank comprising:

a tank sized and configured to hold propane gas therein; and a valve assembly coupled to the tank and configured to be coupled to the flow limiting device, the valve assembly including:

a valve body coupled to the tank, the valve body including a valve passageway with a valve seat at one end of the valve passageway, the valve passageway defined with an internal passage surface, the internal passage surface extending to the valve seat with a radial surface extending adjacent the valve seat at the one end of the valve passageway such that the radial surface defines a widest portion of the valve passageway;

a plug with a flat surface and a tapered portion, the flat surface positionable against the valve seat, the tapered portion of the plug extending from the flat surface so as to be extendable into the valve passageway adjacent the valve seat; and a handle operatively coupled to the plug such that the handle is moveable to move the plug between a closed plug position and an open plug position;

wherein, upon the plug being in the closed plug position, the flat surface of the plug is directly engaged with the valve seat with the tapered portion of the plug extending into the valve passageway and adjacently over the radial surface of the valve passageway so that a gap is defined between the tapered portion and the internal passage surface; and wherein, upon the plug being initially moved from the closed plug position to the open plug position, the tapered portion of the plug is sized and configured to initially minimize the gas flow from the valve passageway and through the flow limiting device such that movement of the tapered portion from the closed plug position expands the gap between the tapered portion and the internal passage surface of the valve passageway.

2. The propane tank of claim 1, wherein the valve passageway extends longitudinally to define a valve passageway axis, the valve passageway axis extending through the plug and the handle.

3. The propane tank of claim 1, wherein the tapered portion extends with a truncated conical configuration.

4. The propane tank of claim 1, wherein the tapered portion of the plug is sized and configured to maintain the gas flow below a predetermined flow rate upon the plug initially being moved to the open plug position.

5. The propane tank of claim 1, wherein the tapered portion extends to define a curved surface.

6. The propane tank of claim 1, wherein the handle comprises a handle stem with external threads thereon.

7. The propane tank of claim 6, wherein the handle stem engages internal threads of an insert, the insert at least partially positioned within the valve body.

8. The propane tank of claim 1, wherein the handle is configured to rotate to linearly move the plug, the handle rotating about a handle axis.

9. The propane tank of claim 8, wherein the valve passageway extends longitudinally to define a valve passageway axis, the valve passageway axis extending through the plug and the handle, the valve passageway axis extending coaxial with the handle axis.

10. The propane tank of claim 1, wherein the tapered portion of the plug extends with a first surface and a second surface with a tapered surface extending between the first and second surfaces.

11. The propane tank of claim 10, wherein, upon the plug being in the closed plug position, the first surface directly engages an end surface of the valve seat.

12. A propane tank valve configured to couple to a tank and control gas through a passageway defined in a flow limiting device, the propane tank valve comprising:

a valve assembly coupled to the tank and configured to be coupled to the flow limiting device, the valve assembly including a valve body coupled to the tank, the valve body including a valve passageway with a valve seat at one end of the valve passageway, the valve passageway defined with an internal passage surface, the internal passage surface extending to the valve seat with a radial surface adjacent the valve seat at the one end of the valve passageway such that the radial surface defines a widest portion of the valve passageway;

a plug with a flat surface and a tapered portion, the flat surface positionable against the valve seat, the tapered portion of the plug extending from the flat surface so as to be extendable into the valve passageway adjacent the valve seat; and a handle operatively coupled to the plug such that the handle is moveable to move the plug between a closed plug position and an open plug position;

wherein, upon the plug being in the closed plug position, the flat surface of the plug is directly engaged with the valve seat with the tapered portion of the plug extending into the valve passageway and adjacently over the radial surface of the valve passageway that a gap is defined between the tapered portion and the internal passage surface; and wherein, upon the plug being initially moved from the closed plug position to the open plug position, the tapered portion of the plug is sized and configured to initially minimize the gas flow from the valve passageway and through the flow limiting device such that movement of the tapered portion from the closed plug position expands the gap between the tapered portion and the internal passage surface of the valve passageway.

13. The propane tank valve of claim 12, wherein the tapered portion extends with a truncated conical configuration.

14. The propane tank valve of claim 12, wherein the tapered portion of the plug is sized and configured to maintain the gas flow below a predetermined flow rate upon the plug initially being moved to the open plug position.

15. The propane tank valve of claim 12, wherein the tapered portion extends to define a curved surface.

16. The propane tank valve of claim 12, wherein the tapered portion of the plug extends with a first surface and a second surface with the tapered surface extending between the first and second surfaces.

17. The propane tank valve of claim 16, wherein, upon the plug being in the closed plug position, the first surface directly engages an end surface of the valve seat.

18. A propane tank for controlling delivery of propane gas therefrom, comprising:

a tank sized and configured to hold the propane gas therein;

a valve body coupled to the tank, the valve body including a valve passageway with a valve seat at one end of the valve passageway, the valve passageway defined with an internal passage surface, the internal passage surface extending to the valve seat with a radial surface extending adjacent the valve seat at the one end of the valve passageway such that the radial surface defines a widest portion of the valve passageway;

a plug with a flat surface and a tapered portion, the flat surface positionable against the valve seat, the tapered portion of the plug extending from the flat surface so as to be extendable into the valve passageway adjacent the valve seat;

a handle operatively coupled to the plug such that the handle is moveable to move the plug between a closed plug position and an open plug position;

a flow limiting device coupled to the valve body, the flow limiting device including a flow limiting device passageway defined therein, the flow limiting device passageway configured to communicate with the valve passageway upon the plug being in the open plug position, the flow limiting device sized and configured to control gas flow from the tank with a blocking component that is moveable to a blocking position upon the gas flow moving through the flow limiting device passageway above a predetermined flow rate;

wherein, upon the plug being in the closed plug position, the tapered portion of the plug is sized and configured to extend into the valve passageway and adjacently over the radial surface of the valve passageway such that a gap is maintained between the tapered portion and the internal passage surface of the valve passageway; and wherein, upon the plug being initially moved from the closed plug position to the open plug position, the tapered portion of the plug is sized and configured to initially maintain the gas flow below the predetermined flow rate so as to substantially prevent the blocking component from being moved to the blocking position.

19. The propane tank of claim 18, wherein the tapered portion extends with a truncated conical configuration.

20. The propane tank of claim 18, wherein the tapered portion of the plug is sized and configured to maintain the gas flow below a predetermined flow rate upon the plug initially being moved to the open plug position.

21. The propane tank of claim 18, wherein the tapered portion extends to define a curved surface.

* * * * *